United States Patent [19]

Brown

[11] 4,311,592
[45] Jan. 19, 1982

[54] FILTER SCREEN FOR WHIRLPOOL APPARATUS

[76] Inventor: David S. Brown, 3957 W. Lawrence Ave., Chicago, Ill. 60625

[21] Appl. No.: 203,897

[22] Filed: Nov. 4, 1980

[51] Int. Cl.³ .............................................. B01D 35/02
[52] U.S. Cl. .............................. 210/416.2; 415/121 G
[58] Field of Search .................. 415/121 G; 210/169, 210/445

[56] References Cited

U.S. PATENT DOCUMENTS

| 2,665,009 | 1/1954 | Harstick ............................. 210/445 |
| 2,730,095 | 1/1956 | Scott ................................. 415/121 G |
| 2,738,787 | 3/1956 | Jacuzzi et al. .................... 415/121 G |
| 3,024,011 | 3/1962 | Wurdack ........................... 415/121 G |
| 3,288,294 | 11/1966 | Frey ................................... 415/121 G |
| 3,685,919 | 8/1972 | Speck ................................ 415/121 G |
| 3,929,648 | 12/1975 | Cuthbert ........................... 210/445 |
| 4,077,739 | 3/1978 | Heilenbach ...................... 415/121 G |

*Primary Examiner*—Theodore A. Granger
*Attorney, Agent, or Firm*—W. A. Snow

[57] ABSTRACT

A wafer-like filter screen for whirlpool apparatus positioned across the water intake and removably secured thereto to prevent foreign objects being drawn into the interior of the apparatus.

2 Claims, 6 Drawing Figures

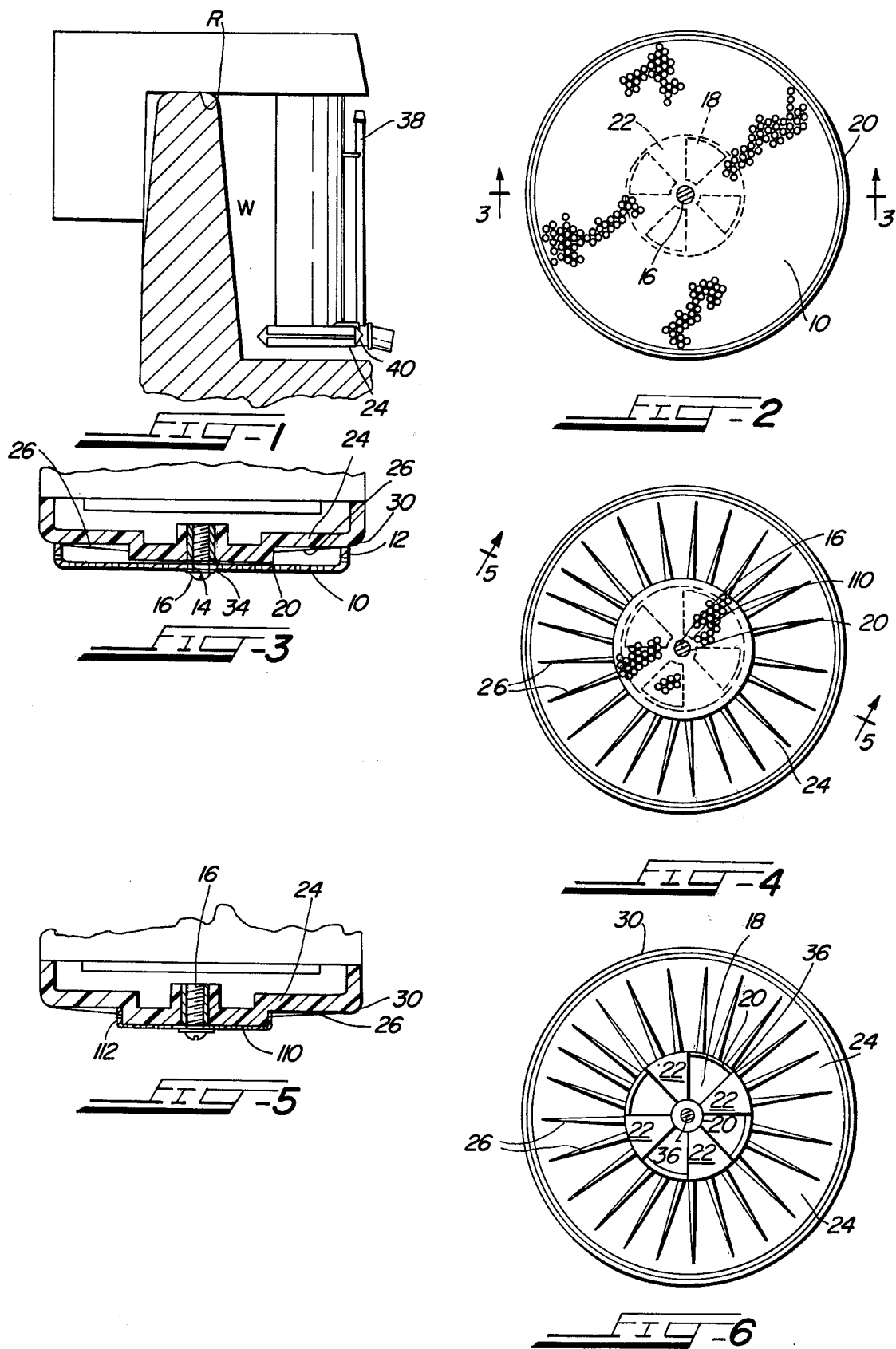

FILTER SCREEN FOR WHIRLPOOL APPARATUS

BACKGROUND OF THE INVENTION

The latest type whirlpool apparatus which is hung on the bathtub rim, the working portion projecting below the water level in the tub, is provided with a water intake and a manually-adjustable control therefor to adjust the amount of water drawn into the whirlpool apparatus. This is a faulty premise since the device needs all the water it can to be drawn into the apparatus to be an effective whirlpool apparatus. Also, no screen is provided to keep foreign particles, etc. from being drawn into the interior of the unit to cause excessive problems. It was to overcome these deficiencies that the present invention was conceived.

SUMMARY OF THE INVENTION

A whirlpool apparatus having four triangular-like vanes extending outwardly from a tapped hub and being offset below the bottom wall of the whirlpool housing, a wafer-thin filter screen having an all-over pattern of perforations and an upwardly-extending, peripheral perforated flange for removably securing the filter screen to the hub of the device and completely surrounding the water intake of the whirlpool unit without any blockage.

BRIEF DESCRIPTION OF THE DRAWINGS

FIG. 1 is a side elevational view of a whirlpool apparatus positioned on the rim of a bathtub which is shown in section;

FIG. 2 is a bottom plan view of the filter of my invention;

FIG. 3 is a vertical cross-sectional view taken on the lines 2—2 of FIG. 1;

FIG. 4 is a bottom plan view of another species of the device of this invention;

FIG. 5 is a vertical sectional view taken on the lines 4—4 of FIG. 3; and

FIG. 6 is a bottom plan view of the whirlpool apparatus to which this invention is directed with the adjustable control removed.

DETAILED DESCRIPTION OF THE DRAWINGS

The device of the present invention comprises a circular, wafer-thin, fragile filter screen 10 provided with all-over perforations and having an upwardly-extending peripheral perforated flange 12.

The filter screen has an axial aperture 14 to receive a screw 16.

The lower end of the whirlpool apparatus to which this invention is applied has a depending, axial annular flange member 20 providing a water inlet 18 between four webs 22 which extend radially from the hub 28 to the flange 20. A series of narrow, vane-type, spoke-like members 26 which are thicker at the flange 20 extend outwardly therefrom almost to the edge 30 of the bottom wall 24 where they terminate. These members 26 grow smaller and narrower as they progress to their terminal end, as shown in the drawings, and meld into the bottom wall 24.

The flange 12 of the filter screen is of a height equal to the height of the annular flange 20 so that when the screw 16 with its washer 34 is secured in the threaded insert 36, the major portion of the screen will lie horizontally to allow water to readily flow therethrough.

When the whirlpool apparatus is placed on the bathtub rim R with the usual working portion P under the water level therein and the rotor energized, the water will be drawn through the filter screen, and when admixed with incoming air through the tube 38, it will be discharged through the plastic pipe 40. Thus no foreign objects can be drawn into the interior of the whirlpool because of the screen.

The species shown in FIGS. 4 and 5 disclose the same filter screen as in FIGS. 2 and 3 except that the diameter of the screen 110 is such as to only encompass the annular flange member 20 with the flange 112 lying against the outer wall thereof and the free ends of flange 112 positioned on the vanes 20.

All parts of the whirlpool apparatus are molded of a plastic so these parts as described are all integral.

It is to be understood that various details shown may be altered or omitted without departing from the spirit of this invention as described in the following claims.

I claim:

1. In a whirlpool bath apparatus to be placed interiorly of a bathtub of water, having an impeller in said apparatus for drawing water from the tub interiorly of said apparatus and having a bottom wall and an integral axial offset portion extending downwardly from the bottom wall forming an axial hub through which water is drawn interiorly of said apparatus and the apparatus having an outlet, in combination with a thin, wafer-like, circular filter screen bearing against substantially the entire bottom wall and hub and to be removably secured to said hub, an upwardly extending integral peripheral flange on the periphery of said filter screen with the free end bearing against said bottom wall.

2. The filter screen according to claim 1 wherein the filter screen encompasses the hub.

* * * * *